United States Patent
Siliski et al.

(10) Patent No.: US 9,305,107 B2
(45) Date of Patent: Apr. 5, 2016

(54) METHOD AND APPARATUS FOR PRE-FETCHING PLACE PAGE DATA FOR SUBSEQUENT DISPLAY ON A MOBILE COMPUTING DEVICE

(75) Inventors: Michael Siliski, San Francisco, CA (US); Takeshi Sasaki, Tokyo (JP)

(73) Assignee: GOOGLE INC., Mountain View, CA (US)

( * ) Notice: Subject to any disclaimer, the term of this patent is extended or adjusted under 35 U.S.C. 154(b) by 495 days.

(21) Appl. No.: 13/314,925

(22) Filed: Dec. 8, 2011

(65) Prior Publication Data

US 2013/0151645 A1    Jun. 13, 2013

(51) Int. Cl.
  *G06F 17/30*  (2006.01)
  *H04W 4/02*  (2009.01)
  *H04L 29/08*  (2006.01)
  *H04W 4/18*  (2009.01)

(52) U.S. Cl.
  CPC .... *G06F 17/30902* (2013.01); *G06F 17/30575* (2013.01); *H04L 67/18* (2013.01); *H04W 4/021* (2013.01); *G06F 2216/13* (2013.01); *H04L 67/2842* (2013.01); *H04L 67/306* (2013.01); *H04W 4/18* (2013.01)

(58) Field of Classification Search
  None
  See application file for complete search history.

(56) References Cited

U.S. PATENT DOCUMENTS

| | | | |
|---|---|---|---|
| 4,984,279 A | 1/1991 | Kidney et al. | |
| 5,345,086 A | 9/1994 | Bertram | |
| 5,793,310 A | 8/1998 | Watanabe et al. | |
| 5,848,373 A | 12/1998 | DeLorme et al. | |
| 5,905,508 A | 5/1999 | Beitel | |
| 6,061,688 A | 5/2000 | Kilpatrick et al. | |
| 6,073,076 A | 6/2000 | Crowley et al. | |
| 6,094,685 A | 7/2000 | Greenberg et al. | |
| 6,191,782 B1 | 2/2001 | Mori et al. | |
| 6,199,150 B1 | 3/2001 | Yoshikawa | |
| 6,330,453 B1 | 12/2001 | Suzuki et al. | |

(Continued)

FOREIGN PATENT DOCUMENTS

| KR | 10-2008-071228 | 8/2008 |
|---|---|---|
| WO | WO-98/28714 A1 | 7/1998 |
| WO | WO-2009/027161 A1 | 3/2009 |

OTHER PUBLICATIONS

Mobile map browsers: anticipated user interaction for data pre-fetching, B.T. Weber, Dr. F. Worboys, University of Maine, Dec. 2010, 101 pages.*

(Continued)

*Primary Examiner* — Greg C Bengzon
(74) *Attorney, Agent, or Firm* — Marshall, Gerstein & Borun LLP

(57) ABSTRACT

A computer-implemented method and system for pre-fetching place page data from a remote mapping system for display on a client computing device is disclosed. User preference data collected from various data sources including applications executing on the client device, online or local user profiles, and other sources may be analyzed to generate a request for place page data from the remote mapping system. The user preference data may indicate a map feature such as a place of business, park, or historic landmark having the characteristics of both a user's preferred geographic location and the user's personal interests. For example, where the user indicates a geographic preference for "Boston" and a personal interest for "home brewing" the system and method may request place page data for all home brewing or craft beer-related map features near Boston.

19 Claims, 4 Drawing Sheets

(56) References Cited

U.S. PATENT DOCUMENTS

| | | |
|---|---|---|
| 6,400,690 B1 | 6/2002 | Liu et al. |
| 6,421,354 B1 | 7/2002 | Godlewski |
| 6,442,757 B1 | 8/2002 | Hancock et al. |
| 6,453,233 B1 | 9/2002 | Kato |
| 6,546,334 B1 | 4/2003 | Fukuchi et al. |
| 6,571,279 B1 | 5/2003 | Herz et al. |
| 6,671,424 B1 | 12/2003 | Skoll et al. |
| 6,691,128 B2 | 2/2004 | Natesan et al. |
| 6,853,911 B1 | 2/2005 | Sakarya |
| 6,889,134 B2 | 5/2005 | Nakane et al. |
| 7,006,820 B1 | 2/2006 | Parker et al. |
| 7,050,905 B2 | 5/2006 | Nemeth |
| 7,136,748 B2 | 11/2006 | Umezu et al. |
| 7,263,368 B2 | 8/2007 | Knauerhase et al. |
| 7,315,259 B2 | 1/2008 | Sacks |
| 7,327,349 B2 | 2/2008 | Robbins et al. |
| 7,461,528 B2 * | 12/2008 | Taniguchi et al. ............ 70/207 |
| 7,464,109 B2 | 12/2008 | Modi |
| 7,472,172 B2 | 12/2008 | Anderson et al. |
| 7,502,780 B2 | 3/2009 | Thorpe |
| 7,502,876 B1 | 3/2009 | Nemirovsky et al. |
| 7,529,639 B2 * | 5/2009 | Rasanen et al. ............ 702/150 |
| 7,551,182 B2 | 6/2009 | Bethune et al. |
| 7,571,422 B2 | 8/2009 | Adel et al. |
| 7,577,520 B2 | 8/2009 | Nomura |
| 7,584,434 B2 | 9/2009 | Okamura |
| 7,610,147 B2 | 10/2009 | Umezu et al. |
| 7,663,671 B2 | 2/2010 | Gallagher et al. |
| 7,710,421 B2 | 5/2010 | Muramatsu |
| 7,711,473 B2 | 5/2010 | Sekine et al. |
| 7,734,412 B2 | 6/2010 | Shi et al. |
| 7,739,037 B2 | 6/2010 | Sumizawa et al. |
| 7,796,837 B2 | 9/2010 | Lueck |
| 7,831,383 B2 | 11/2010 | Oohashi |
| 7,831,387 B2 | 11/2010 | Golding et al. |
| 7,839,421 B2 | 11/2010 | Bethune et al. |
| RE41,983 E | 12/2010 | Wallner |
| 7,873,465 B2 | 1/2011 | Geelen et al. |
| 7,920,968 B2 | 4/2011 | Chapin et al. |
| 7,925,624 B2 | 4/2011 | Vosshall et al. |
| 7,925,982 B2 | 4/2011 | Parker et al. |
| 7,962,565 B2 | 6/2011 | Coker |
| 7,974,959 B2 | 7/2011 | Sawai et al. |
| 7,975,025 B1 | 7/2011 | Szabo et al. |
| 7,983,659 B2 | 7/2011 | Shinya |
| 7,996,445 B2 | 8/2011 | Fair et al. |
| 8,005,612 B2 | 8/2011 | Asahara et al. |
| 8,010,407 B1 | 8/2011 | Santoro et al. |
| 8,014,796 B2 | 9/2011 | Boudreau et al. |
| 8,014,945 B2 | 9/2011 | Cooper et al. |
| 8,032,297 B2 | 10/2011 | Jakobson |
| 8,060,389 B2 | 11/2011 | Johnson |
| 8,060,406 B2 * | 11/2011 | Blegen ............ 705/14.58 |
| 8,060,582 B2 | 11/2011 | Bliss et al. |
| 8,078,641 B2 | 12/2011 | Mao et al. |
| 8,095,307 B2 | 1/2012 | Ebert et al. |
| 8,126,885 B2 * | 2/2012 | Prasad et al. ............ 707/727 |
| 8,180,851 B1 | 5/2012 | CaveLie |
| 8,204,966 B1 | 6/2012 | Mendis et al. |
| 8,229,914 B2 * | 7/2012 | Ramer et al. ............ 707/709 |
| 8,280,414 B1 | 10/2012 | Nourse et al. |
| 8,301,371 B2 * | 10/2012 | Sheha et al. ............ 701/426 |
| 8,340,898 B2 | 12/2012 | Currie et al. |
| 8,361,543 B2 | 1/2013 | Nielsen et al. |
| 8,363,065 B2 | 1/2013 | Scott et al. |
| 8,385,591 B1 | 2/2013 | Anguelov et al. |
| 8,489,332 B2 | 7/2013 | Tomobe et al. |
| 8,489,669 B2 * | 7/2013 | Johnson ............ 709/203 |
| 8,538,685 B2 * | 9/2013 | Johnson ............ 701/425 |
| 8,543,130 B2 | 9/2013 | Golds |
| 8,549,105 B1 | 10/2013 | Nourse et al. |
| 8,683,008 B1 | 3/2014 | CaveLie |
| 8,711,181 B1 | 4/2014 | Nourse et al. |
| 2002/0067353 A1 | 6/2002 | Kenyon et al. |
| 2002/0133491 A1 | 9/2002 | Sim et al. |
| 2003/0187984 A1 | 10/2003 | Banavar et al. |
| 2004/0044752 A1 | 3/2004 | Hamaguchi et al. |
| 2004/0117108 A1 | 6/2004 | Nemeth |
| 2004/0203998 A1 | 10/2004 | Knauerhase et al. |
| 2004/0204849 A1 * | 10/2004 | Shipley et al. ............ 701/212 |
| 2004/0205199 A1 | 10/2004 | Gormish |
| 2004/0220730 A1 | 11/2004 | Chen et al. |
| 2005/0287509 A1 | 12/2005 | Mohler |
| 2006/0026170 A1 | 2/2006 | Kreitler et al. |
| 2006/0067224 A1 | 3/2006 | Ohara |
| 2006/0069749 A1 | 3/2006 | Herz et al. |
| 2006/0080032 A1 | 4/2006 | Cooper et al. |
| 2006/0129636 A1 | 6/2006 | Matsuura et al. |
| 2006/0184541 A1 | 8/2006 | Kim |
| 2006/0190812 A1 | 8/2006 | Ellenby et al. |
| 2006/0195256 A1 | 8/2006 | Nakamura et al. |
| 2006/0277271 A1 | 12/2006 | Morse et al. |
| 2007/0011171 A1 | 1/2007 | Nurminen et al. |
| 2007/0050128 A1 | 3/2007 | Lee et al. |
| 2007/0080830 A1 | 4/2007 | Sacks |
| 2007/0143014 A1 | 6/2007 | Sekine et al. |
| 2007/0229490 A1 | 10/2007 | Boudreau et al. |
| 2007/0242077 A1 | 10/2007 | Danan |
| 2007/0273558 A1 | 11/2007 | Smith et al. |
| 2007/0282621 A1 * | 12/2007 | Altman et al. ............ 705/1 |
| 2007/0282915 A1 | 12/2007 | Vosshall et al. |
| 2008/0065329 A1 | 3/2008 | Wilcox et al. |
| 2008/0071988 A1 | 3/2008 | Schloter et al. |
| 2008/0082225 A1 | 4/2008 | Barrett |
| 2008/0086264 A1 | 4/2008 | Fisher |
| 2008/0095472 A1 | 4/2008 | Smith |
| 2008/0102857 A1 | 5/2008 | Kim |
| 2008/0132249 A1 | 6/2008 | Hamilton |
| 2008/0154655 A1 * | 6/2008 | Hartmann et al. ............ 705/5 |
| 2008/0177469 A1 | 7/2008 | Geelen et al. |
| 2008/0192053 A1 | 8/2008 | Howell et al. |
| 2008/0195311 A1 | 8/2008 | Karaoguz et al. |
| 2008/0214210 A1 * | 9/2008 | Rasanen et al. ............ 455/456.3 |
| 2008/0215240 A1 | 9/2008 | Howard et al. |
| 2008/0238723 A1 | 10/2008 | Fein et al. |
| 2008/0270579 A1 | 10/2008 | Herz et al. |
| 2008/0291205 A1 | 11/2008 | Rasmussen et al. |
| 2009/0030778 A1 | 1/2009 | Zapata et al. |
| 2009/0054103 A1 * | 2/2009 | Stavenow et al. ............ 455/556.2 |
| 2009/0063042 A1 | 3/2009 | Santesson et al. |
| 2009/0125228 A1 | 5/2009 | Dicke et al. |
| 2009/0128483 A1 | 5/2009 | Robbins et al. |
| 2009/0132163 A1 | 5/2009 | Ashley, Jr. et al. |
| 2009/0153563 A1 | 6/2009 | Tudose |
| 2009/0182500 A1 | 7/2009 | Dicke |
| 2009/0198767 A1 | 8/2009 | Jakobson et al. |
| 2009/0210388 A1 | 8/2009 | Elson et al. |
| 2009/0228211 A1 * | 9/2009 | Rasanen et al. ............ 702/1 |
| 2009/0244095 A1 | 10/2009 | Bowman et al. |
| 2009/0281718 A1 | 11/2009 | Gibran et al. |
| 2009/0287750 A1 | 11/2009 | Banavar et al. |
| 2009/0319177 A1 | 12/2009 | Khosravy et al. |
| 2009/0319181 A1 | 12/2009 | Khosravy et al. |
| 2009/0319188 A1 | 12/2009 | Otto |
| 2009/0326810 A1 | 12/2009 | Callaghan et al. |
| 2010/0017129 A1 | 1/2010 | Wilcox et al. |
| 2010/0020091 A1 | 1/2010 | Rasmussen et al. |
| 2010/0106397 A1 | 4/2010 | Van Essen |
| 2010/0106801 A1 | 4/2010 | Bliss et al. |
| 2010/0117810 A1 | 5/2010 | Hagiwara et al. |
| 2010/0131186 A1 | 5/2010 | Geelen et al. |
| 2010/0153007 A1 | 6/2010 | Crowley |
| 2010/0179940 A1 | 7/2010 | Gilder et al. |
| 2010/0182500 A1 | 7/2010 | Ishii et al. |
| 2010/0250646 A1 | 9/2010 | Dunagan et al. |
| 2010/0274899 A1 | 10/2010 | Shrivastava et al. |
| 2010/0321399 A1 | 12/2010 | Ellren et al. |
| 2010/0332120 A1 | 12/2010 | Tomobe et al. |
| 2010/0333085 A1 | 12/2010 | Criddle et al. |
| 2011/0054776 A1 | 3/2011 | Petrov et al. |
| 2011/0093515 A1 | 4/2011 | Albanese |
| 2011/0095993 A1 | 4/2011 | Zuverink |
| 2011/0098917 A1 | 4/2011 | LeBeau et al. |
| 2011/0098918 A1 | 4/2011 | Siliski et al. |

(56) References Cited

U.S. PATENT DOCUMENTS

| | | | |
|---|---|---|---|
| 2011/0130949 | A1 | 6/2011 | Arrasvuori |
| 2011/0161875 | A1* | 6/2011 | Kankainen .................... 715/810 |
| 2011/0213798 | A1 | 9/2011 | Osuka et al. |
| 2011/0276263 | A1 | 11/2011 | Shimotani et al. |
| 2011/0300848 | A1 | 12/2011 | Boudreau et al. |
| 2011/0306304 | A1* | 12/2011 | Forutanpour et al. ...... 455/67.11 |
| 2011/0307648 | A1 | 12/2011 | Nomura |
| 2011/0316854 | A1 | 12/2011 | Vandrovec |
| 2012/0005290 | A1 | 1/2012 | Cooper et al. |
| 2012/0022786 | A1 | 1/2012 | Siliski et al. |
| 2012/0022787 | A1 | 1/2012 | LeBeau et al. |
| 2012/0083995 | A1 | 4/2012 | Vorona |
| 2012/0146809 | A1 | 6/2012 | Oh et al. |
| 2012/0221239 | A1 | 8/2012 | Cooper et al. |
| 2012/0253488 | A1* | 10/2012 | Shaw et al. ..................... 700/91 |
| 2012/0254804 | A1 | 10/2012 | Sheha et al. |
| 2013/0097197 | A1* | 4/2013 | Rincover et al. .............. 707/766 |
| 2013/0325307 | A1* | 12/2013 | Agarwal et al. ............... 701/117 |
| 2014/0073358 | A1* | 3/2014 | Sridhar et al. ............. 455/456.3 |

OTHER PUBLICATIONS

Reichenbacher et al., "The World in Your Pocket—Towards a Mobile Cartography," Proc. of the 20th International Cartographic Conference, 2001, 9 pages.

Piras et al., "Compact GML: merging mobile computing and mobile cartography," CRS4, Center for Advanced Studies, Research and Development in Sardinia, 2004, 20 pages.

Molina, "Aiming and Guiding Navigation with a Non-visual GPS Application," Department of Design Sciences Faculty of Engineering, Lund University, Sep. 9, 2010, 64 pages.

Kirchner et al. "A Location-aware Prefetching Mechanism," Project work at Distributed Information Systems Laboratory LSIR, 2004.

Weber, "Mobile Map Browsers: Anticipated User Interaction for Data Pre-Fetching," Thesis, The University of Maine, Dec. 2010.

Office action for U.S. Appl. No. 13/244,764 dated Nov. 28, 2011.

Office action for U.S. Appl. No. 13/244,717 dated Nov. 15, 2011.

Google Developers, "Google Maps API," (2012). Retrieved from the Internet on Aug. 31, 2012: URL:https://developers.google.com/maps/.

International Search Report and Written Opinion for Application No. PCT/US2012/051574, dated Feb. 15, 2013.

International Search Report and Written Opinion for Application No. PCT/US2012/051577, dated Feb. 15, 2013.

International Search Report and Written Opinion for Application No. PCT/US2012/065002, dated Mar. 29, 2013.

International Search Report and Written Opinion for Application No. PCT/US2012/065008, dated Mar. 29, 2013.

International Search Report for Application No. PCT/US2012/051564, dated Feb. 18, 2013.

Mapquest, "JavaScript Maps API," (2012). Retrieved from the Internet on Aug. 31, 2012: URL:http://developer.mapquest.com/web/products/featured/javascript.

MSDN, "Get Started Using Bing Maps," (2012). Retrieved from the Internet on Aug. 31, 2012: URL:http://msdn.microsoft.com/en-us/library/dd877180.aspx.

Wiki, "API," (2012). Retrieved from the Internet on Aug. 31, 2012: URL:http://wiki.openstreetmap.org/wiki/API.

International Preliminary Report on Patentability for Application No. PCT/US2012/065008, dated Jun. 10, 2014.

International Preliminary Report on Patentability for Application No. PCT/US2012/065002, dated May 20, 2014.

International Preliminary Report on Patentability for Application No. PCT/US2012/051574, dated Jun. 17, 2014.

International Preliminary Report on Patentability for Application No. PCT/US2012/051577, dated Jun. 17, 2014.

Descampe et al., "Data Prefetching for Smooth Navigation of Large Scale JPEG 2000 Images," IEEE, Multimedia and Expo, pp. 1-4 (2005).

International Preliminary Report on Patentability for Application No. PCT/US2012/051564, dated Apr. 1, 2014.

Extended European Search Report for Application No. 12855169.4, dated Mar. 23, 2015.

Magdalene et al., "Cache Prefetch and Replacement with Dual Valid Scopes for Location Dependent Data in Mobile Environments," Proceedings of the 11th International Conference on Information Integration and Web-Based Applications & Services, pp. 364-371 (2009).

Ren et al., "Using Semantic Caching to Manage Location Dependent Data in Mobile Computing," Proceedings of the Annual International Conference on Mobile Computing and Networking, pp. 210-221 (2000).

* cited by examiner

METHOD AND APPARATUS FOR PRE-FETCHING PLACE PAGE DATA FOR SUBSEQUENT DISPLAY ON A MOBILE COMPUTING DEVICE

FIELD OF TECHNOLOGY

The present disclosure relates generally to pre-fetching place page data for subsequent display on a mobile computing device during periods of no connectivity with the source of the place page data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate global positioning system (GPS) applications and related hardware. When actuated on the device, the GPS applications may communicate with a GPS transmitter or other GPS hardware on the device and a backend application server to provide a digital map of an area around the device's current position to a user, as well as label data and place page data.

However there may be circumstances when the mobile computing device is in an area with limited network, cellular, or other communication access with the backend application server, which limits, or otherwise precludes, immediate, real time access to such data, potentially adversely affecting the user's experience.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method may pre-fetch place page data to a mapping application executing on a client computing device from a remote mapping system for subsequent display on the client computing device. The method may comprise analyzing user preferred geographic location data and user personal interests data to determine user preference data. The user preferred geographic location data may include data indicating a particular map location that is preferred by a user of the client computing device. The user personal interest data may include data indicating personal interests of the user. The method may also match the user preference data with place page data of the remote mapping system. The place page data may include text, graphics, and data feed data describing a map feature corresponding to both a particular map location that is preferred by the user and a personal interest of the user. The method may also send the matched place page data from the remote mapping system to the client computing device and store the matched place page data in a cache memory of the client computing device. The stored place page data may then be subsequently retrieved from the cache memory of the client computing device without further communication between the remote mapping system and the client computing device.

The user preferred geographic location data may include one or more of a city name, an address, an airport code, or global positioning system coordinates. This user preferred geographic location data may be indicated by one or more of a GPS position that was flagged using the mapping application, a geographic location returned to the client computing device by the remote mapping system, and a geographic location having an indicated preference. Furthermore, the user personal interests data may be retrieved from one or more of a social networking application, an e-mail application, and a web browser of the client computing device. The user personal interests data includes one or more of user profile data, social networking data, web browser history data, e-mail text, and calendar appointment data.

In another embodiment, a computer-implemented method for pre-fetching place page data from a remote mapping system to a mapping application may subsequently display the place page data on a client computing device executing the mapping application during conditions of no connectivity between the remote mapping system and the client computing device. This embodiment may periodically send user preferred geographic location data and user personal interests data from the client computing device to a backend user preferences system. The client computing device may receive place page data from the remote mapping system in response to the sent user preferred geographic location data and user personal interests data. The place page data may include one or more of text, graphics, and data feed data describing a map feature corresponding to both a particular map location that is preferred by the user and a personal interest of the user. This received place page data may then be stored in a cache memory of the client computing device and subsequently retrieved without further communication between the remote mapping system and the client computing device.

A client computing device may include a processor and a memory storing an application and instructions for execution by the processor. The instructions may be for using the processor to periodically cause user preferred geographic location data and user personal interests data to be sent from the client computing device to a backend user preferences system via a network connection. The user preferred geographic location data may include data indicating a particular map location that is preferred by a user of the client computing device. The user personal interest data may include data indicating personal interests of the user. The client computing device may also include a transceiver for receiving place page data from a remote mapping system via the network connection. The place page data may be received in response to the sent user preferred geographic location data and user personal interests data. The place page data may include one or more of text, graphics, and data feed data describing a map feature corresponding to both the particular map location that is preferred by the user and the personal interest of the user. Further, a cache memory may store the place page data received by the transceiver, and a mapping module may include instructions to cause the processor to display the received place page data from the cache memory without further communication between the remote mapping system and the client computing device.

A remote mapping system embodiment may also comprise a processor and a memory. The memory may be in communication with the processor and store a map controller including instructions for execution by the processor. First instructions may cause the processor to receive a request for place page data corresponding to user preference data generated by a user preferences system in communication with the map controller. The user preference data may include a combination of user preferred geographic location data and user personal interests data generated by a client computing device. The user preferred geographic location data may include data indicating a particular map location that is preferred by a user of the client computing device and user personal interest data may include data indicating personal interests of the user. Second instructions may cause the processor to match the user preference data with place page data of the remote mapping system. The place page data may include one or more of text, graphics, and data feed data describing a map feature corresponding to both a particular map location that is preferred by the user and a personal interest of the user. Third instructions may cause the processor to send the matched place page data from the remote mapping system to the client computing device for storage in a cache memory of the client computing device. The client computing device may be configured to subsequently retrieve the matched place page data from the cache memory without further communication between the remote mapping system and the client computing device.

Figure 1A:
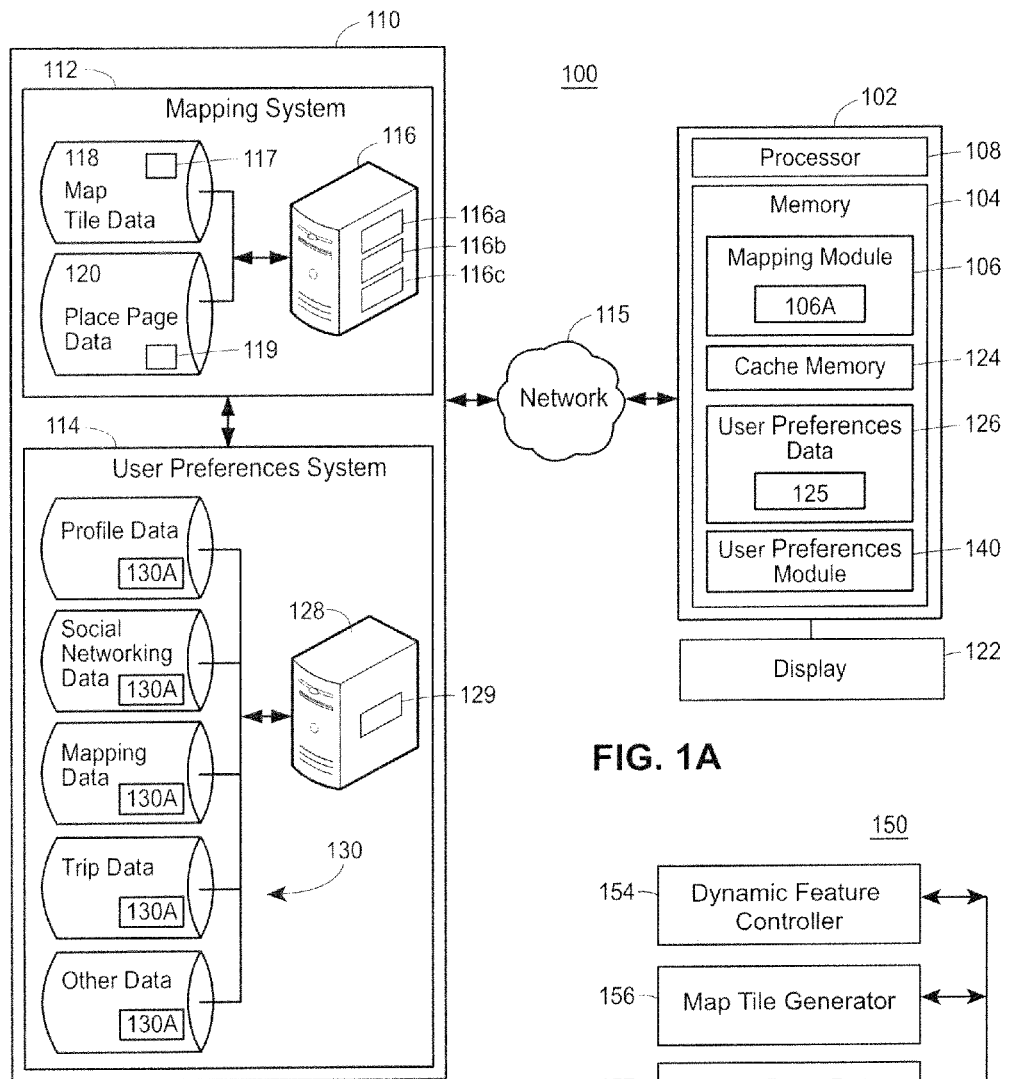
FIG. 1A is a high-level block diagram of a system for pre-fetching place page data for cache storage on a mobile computing device.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Embodiments of systems and methods for efficiently transferring place page data that is logically linked to map data from a place page data server to a client device are discussed below. To render a map image in a web browser, mapping application, or another application, the client device may request map data from the map server via a communication network, and the map server in response may provide vector data that describes map graphic content as well as place page data that describes features of the rendered vector data. More particularly, vector data may specify various geometric shapes (e.g., using mathematical descriptions) for map features and indicate how these shapes should be positioned for rendering various map features such as roads, buildings, parks, bodies of water, etc. on the client computing device. Place page data may describe each map feature using text, graphics, web pages, etc. The map server also may specify which visual styles the client device should apply to various vector-based descriptions of map features.

Graphical data to render a map image on a mobile computing device is relatively data (and thus memory) intensive. Place page data may be separately pre-fetched or pre-downloaded via a network connection before it is requested by the user so that this place page data is available independent of all or some of the memory burden of accompanying map tile data. For example, data logically associated with the digital map data may include label data for the various buildings, roads, and other graphic elements of the map. Other data may include place page data that provides detailed information about various buildings, businesses, points of interest, or other graphic elements or "features" of the map. Place page data may be requested separately from the graphic elements of a map from a place page data server via a network connection between a mobile computing device and the server. This place page data may then be stored in a cache memory of the mobile computing device. The place page data may then be available at times of low connectivity between the mobile device and the server, or in situations where the graphic map data may be unnecessary for navigation. For example, the place page data may be useful without accompanying graphic map data in dense, urban areas where the user is aware of his or her location, but is not aware of various businesses or other information about his or her location.

As described below, user preferences, expressed interests, social networking information, etc., may be analyzed to determine locations for place page data that may be of interest to the user. The place page data may be pre-fetched to the mobile device, either at the request of a place page module at the mobile device or pushed to the mobile device by a back-end server.

The user interest analysis may determine one or more businesses or other places of interest at the user's current or preferred geographic locations. This analysis may be performed at the backend or the mobile device and may consider all, or portions of, data related to the user's online expressed personal interests (e.g., social networking profile, professional profile, personal or business listing information, etc.), geographic interests, or combination of data. In further embodiments, the system may use data related to where the user spends most of his or her time, searches the user has performed via searching modules, trips the user has planned, information in e-mails sent or received by the user, and the like.

FIG. 1A is a high-level block diagram that illustrates a system 100 for pre-fetching mapping system data, including place page data, for storage in cache memory. Generally, the client computing device 102 may include a memory 104 storing a mapping module 106 that is executed by a processor 108. The mapping module 106 may include instructions to pre-fetch place page data from a backend server based on an analysis of user geographic preferences, personal interests, and other data. The client computing device 102 may include a personal computer, smart phone, tablet computer, or other computing device including a GPS transceiver and capable of executing the various modules, instructions, etc., described herein. The mapping module 106 may communicate with backend components 110 including a mapping system 112 and a user preferences system 114 via a network connection such as the Internet 115 or other type of networks (e.g., LAN, a MAN, a WAN, a mobile, a wired or wireless network, a private network, or a virtual private network, etc.). While the system 100 is illustrated in FIG. 1A as including the user preferences system 114 as a backend component, the components and functions of the user preferences system 114 described herein may also be incorporated on the client computing device 102. For example, the user preferences system 114 may be implemented as computer-executable instructions of the mapping module 106 or as a separate user preferences module 140.

A mapping system server 116, which may be in the form of one or more servers, may send and receive map tile data 117 from a map tile data repository 118, and place page data 119 from a place page data repository 120 that corresponds to geographical features of the map tile data 117. In some embodiments, the mapping system 112 and the system server 116 may send computer-executable instructions and data to allow the mapping module 106 to render a digital map in a display component 122 of the client device 102. While using the mapping module, 106, a user may indicate one or more preferred geographic locations 106A. For example, after a map search result is returned to the device 102 (as described below), a user may cause the mapping module 106 to execute instructions to flag a particular location (e.g., address, map feature, GPS point, etc.) within the returned search result as a "favorite" or otherwise indicate that a particular map location is preferred by the user. Geographic locations for which the user has indicated a preference (e.g., mapping module search results favorites, hometown, favorite cities, planned trips, etc.) may be collected at the device 102 and instructions of the user preferences module 140 may be executed to determine additional preferred geographic locations 106A at which the user is likely to request place page data from the mapping server 116.

In some embodiments, user personal interests data 125 may be determined at the client device 102 or retrieved from various sources. The user personal preferences data may indicate the user's personal interests (e.g., food, hobbies, sports teams, etc.). For example, the user preferences module 126 may execute instructions to determine or collect a user's personal interests data 125 from various local and remote sources (e.g., a personal profile saved at the client computing device 102, online personal profile and interest data from social networking and other sites, profile data from other applications executing on the device 102, etc.). The user personal interests data 125 may also be collected from a variety of applications and modules executing on the client device 102 or in communication with the device 102 (e.g., a mapping application, a web browser, a user activity tracking module, a trip planning module, an email module, a social networking system, etc.) and stored in a user preferences data repository 126. The data 125 may include a user profile stored on the device 102, user preferences from applications executing on the device 102 (e.g., favorite locations as saved during execution of a mapping module 106, a social networking application that includes a user profile, interests, and other data, etc.), a web browsing history, e-mail text, a calendar appointment for travel, etc. The data 125 may be analyzed at the client device 102 to determine a user's geographic and personal interests.

The combination of user preferred geographic location data 106A and user personal interests data 125 indicates businesses or other map features for which the user may request place page data 119 in the future. Place page data 119 may then be pre-fetched for those geographic and personal interests and stored in a cache memory 124 of the client device memory 104 for possible display to a user during a period of low connectivity to the mapping system 112 or at any other time.

In another embodiment that determines user geographic and personal preferences data at the backend 110, user geographic/personal preferences data 130A may be collected from online resources 130 that are associated with a user and analyzed to determine geographic and personal interest locations at which the user is likely to request place page data from the mapping server 116, or user preferences and interests that may indicate businesses or other map features for which the user may request place page data in the future. The user geographic/personal preferences data 130A may be collected from a variety of online resources 130 linked by a common user account. For example, a backend server 128 may include a module 129 with instructions that, upon execution, collect information related to web searches conducted by the user, social networking profile information, user subscriptions to news feeds related to the user's interests, searches related to a mapping module 106, etc. The data 130A may be analyzed at the client device 102 to determine a user's geographic preferences 106A and personal interests 125. Place page data 119 may then be pre-fetched from a place page data repository 120 for those interests at the user's preferred geographic locations and stored in a cache memory 124 of the client device memory 104 for possible display to a user during a period of low connectivity to the mapping system 112 or at any other time. Other embodiments may determine user geographic location preferences and personal interests data using a combination of front end 102 and backend 110 components.

In response to a request from a client computing device 102, the mapping system 112 may process and send graphics, text, and other data for a map image to be displayed on a client computing device 102. A client device 102 request may also cause the mapping system 112 to send place page data 119 that may be displayed with the graphic map tile data 117 or be linked to the displayed map tile data 117. The place page data 119 may be displayed in the display 122 of the device 102 with or without also displaying the map tile data 117 that includes features that are described by the place page data 119. The graphic components (i.e., map tile data 117) and text or other data (i.e., place page data) may be processed and sent to the device 102 together or separately. When the client computing device 102 requests data 117, 119 from the mapping system 112, the system 112 may generate each map tile 117 with or without place page data 119 according to a vector graphics format. The client device 102 (e.g., a mobile phone, tablet computer, etc.) may locally rasterize the vector data corresponding to each map tile for display at the device 102.

In an embodiment, the system 100 retrieves the requested data from various servers. For example, the mapping system server 116 may include a processor 116a and a computer-readable memory 116b that stores a map controller 116c in the form of computer instructions, for example, that may be executable on the processor 116a directly (e.g., as compiled code) or indirectly (e.g., as a script interpreted by another application executing on the processor 116a). The computer-readable memory 116b may include volatile memory to store computer instructions and data on which the computer instructions operate at runtime (e.g., Random Access Memory or RAM) and, in an embodiment, persistent memory such as a hard disk, for example. In an embodiment, the map controller 116c includes a dynamic feature controller 154 (FIG. 1B) that generates vector data for various map elements that are provided as map content to the client device 102. As used herein, a map feature (or simply feature) may correspond to an individual map element such as a building or an aggregation of several map elements such as several buildings, a park, and several pedestrian paths of a college campus. In general, a map feature may be described using vector data. Place page data 119 may include data that describes business and/or administrative aspects of the map tile features including textual information, images, data feeds, web content for the map features (i.e., businesses, landmarks, etc.), etc.

In some embodiments, the mapping module 106 receives vector data that specifies both graphical characteristics of map features as well as place page data 119 that describes these features. Vector data specifies the map features as geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The mapping module 106 then may apply place page data 119 as appropriate to the specified line segment, so that the line segment is displayed with a particular title, description, etc. As another example, the vector data may specify the contour of a building, and the corresponding place page data 119 may specify the name, description, web page, contact information, address, etc., of the building. In other words, rather than receiving raster images from the map server 116, the mapping module 106 may receive instructions for drawing a map image on an output device 122 of the client computing device 102 and execute the instructions to generate a raster map image. In some cases, however, vector data also may include raster images as certain component elements that cannot be easily represented in a vector format.

In other embodiments, the mapping module 106 receives only place page data 119 corresponding to a requested, preferred, or predicted geographic location, as described herein. Rather than the vector format described above for receiving map tile data 117, the system 100 may respond to a request from the device 102 by sending place page data in a common text (e.g., SMS, ANSI, ASCII) or in a proprietary format for both image and text display and formatting on the device 102. For example, a user activity module 140 on the client device 102, a remote user preferences system 114, or a combination of modules and systems may include instructions to process user geographic/personal preferences data 130A (including geographic preferences 106A and personal interests 125). Processing this data 130A may determine geographic and personal interest locations at which the user is likely to request place page data 119 from the mapping server 116, or user preferences and interests that may indicate businesses or other map features for which the user may request place page data 119.

For simplicity, the client device 102 is illustrated with a single processor 108 to execute various modules stored in the device memory 104, as described herein. The client device 102 in other embodiments may include additional processing units (not shown) such as a graphics processing unit (GPU) configured to facilitate image rendering on the output device 122, for example. Further, the mapping module 106 may utilize a library of graphics functions for efficiently generating a map image as well as place page data 119, or place page data 119 alone. For example, the memory 104 may store a plugin, such as an OpenGL® or Direct3D® library, having functions for rendering graphics which various applications executing on the client 102, including the mapping module 106, may access via an application programming interface (API). In another embodiment, the memory 104 stores a plugin particularly suitable for browser applications, such as WebGL®, for example. Also, in some embodiments, the memory 104 stores additional software components that facilitate efficient rendering of images and place page data 119 via the output device 122. For example, the memory 104 may store an Adobe® Flash® plugin or an O3D plugin.

Figure 1B:
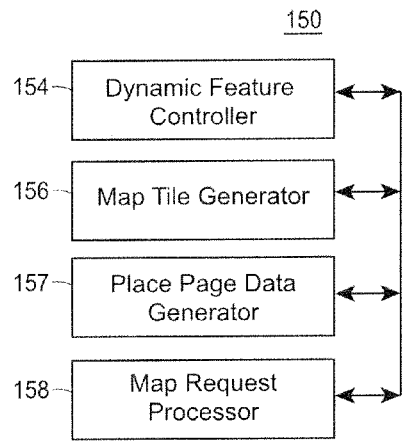
FIG. 1B is a high-level block diagram of a component of the system for pre-fetching place page data to a mobile computing device.

Now referring to FIG. 1B, a map controller 150 may include various functions and operate as a module in the memory of the client computing device 102 or in the server 116 of FIG. 1A, for example, or the various functions may be split among the client computing device 102 and the server 116, as described above. According to an embodiment, the map data controller 150 is implemented as a set of instructions that are stored on a computer-readable medium and executable on one or more processors. For example, referring back to FIG. 1A, the map data controller 150 and its various functions may be distributed among the memories 116b, 104 and processors 116a, 108.

According to an embodiment, the map controller 150 includes a dynamic feature controller 154, a map tile generator 156, a place page data generator 157, and a map request processor 158. The map request processor 158 may be configured to process requests from client devices, such as the client device 102, for map data 117 and/or place page data 119 corresponding to specified or user preferred geographic regions. Each request may correspond to a single electronic message or a series of electronic messages, depending on the scenario and/or embodiment. For example, the map request processor 158 may receive a request for map data corresponding to a two-mile-wide region centered at latitude 41° 52' 43" and longitude −87° 38' 11". The map request processor 158 may also receive a request for place page data 119 corresponding to personal interests 125, 103A within that region. The request may also indicate a zoom level for which map data is being requested which determines an amount of map tile data 117 and place page data 119 that will be returned by the mapping system 112. Depending on the scenario (i.e., requesting map tile and place page date together or separately), the map request processor 158 may receive a request for map data and a request for place page data 119 in a single electronic message, e.g., a single HTTP message, or separately in respective electronic messages.

After the map request processor 158 receives a request for map data 117 and/or place page data 119 from a client device, the map controller 150 provides appropriate data to the client device via one or more electronic messages. In some embodiments, the map request processor 158 may includes instructions to determine what type of data is being requested and execute a function call to one or more of the map tile generator 156 or the place page data generator 157 to retrieve the requested data from the appropriate data repository 118, 120. The map tile generator 156 may include instructions to generate map data as a set of map tile descriptors, such that each map tile descriptor describes a map tile, i.e., a portion of a map image of a certain size (e.g., 256 by 256 pixels). The size of a geographic region represented by an individual map tile depends on the zoom level with which the map tile is associated, so that a single map tile at a lower zoom level illustrates a larger geographic area than a single map tile at a higher zoom level. The map tile generator 156 may generate each map tile descriptor according to a vector graphics format, and a client device, such as the client device 102 of FIG. 1A, may locally generate a raster image for each tile. The map tile generator 156 may retrieve the requested data from a map database such as the map tile database 118. The place page data generator 157 may generate place page data 119 in conjunction with the response to the request for map data, or in response to a request for place page data 119 alone. In some embodiments, the place page data generator 157 includes instructions to generate place page data 119 from multiple entries of the data repository 120 that correspond to a requested geographic region or a preferred geographic region 106A. The place page data generator 157 may also include instructions to generate place page data 119 from multiple entries of the data repository 120 that correspond to one or both of the requested/preferred geographic region 106A and user personal interests data 125. For example, where a user requests map tile data for "Boston" and user profile or other data indicates that a hobby of the user is "homebrewing" the map request processor 158 may employ one or more of the map tile generator 156 or the place page data generator 157 to return map tile data 117 and/or place page data 119 corresponding to homebrewing shops or craft beer-related businesses in the Boston area. Similarly, the map request processor 158 may retrieve place page data 119 corresponding to the user's personal interests 125 where that place page data 119 is associated with businesses and other map features that are also within areas of the user's geographic preferences 106A. For example, when a user's preferred location 106A includes "Chicago" and the user's personal interests include "homebrewing" then place page data 119 for homebrewing shops and craft beer-related businesses may be requested from the map controller 150 and stored in a cache memory 124 of the device 102 with the user initiating a particular request for the data 119.

When providing graphic map data to a client device, the map controller 150 may separate map tile data 117 from place page data 119. In some cases, the map controller 150 may provide vector data that describes map content without providing the corresponding place page data 119 to the client device at the same time (if, for example, the client device already has the necessary place page data) or, conversely, may provide place page data 119 without providing the vector data for graphical map content to which the place page data 119 applies (for rendering a geographic region at a more detailed zoom level and using place page data 119 that was sent with a previous request for the geographic region at a different zoom level, for example). Further, in some scenarios, the map controller 150 provides vector data and place page data 119 at the same time (e.g., in a same electronic message or a series of electronic messages). For example, when the map request processor 158 receives a request for map data and queries the map data repository 118 for map tile data 117, the label and place page controller 152 queries the place page data repository 120 for place page data 119 that corresponds to the geographical area of the requested map tile data 117. As with the map tile data 117, the amount of place page data corresponding to the requested map data 117 may depend on the zoom level with which the map tile is associated. For example, a single map tile at a lower zoom level illustrates a larger geographic area and, thus, corresponds to more label and place pace data 119 than a single map tile at a higher zoom level. In some embodiments, the place page data generator 157 may query the place page data repository 120 for only the data 119 that is visible at the zoom level of the requested map data 117. In other embodiments, the place page data generator 157 may query the repository 120 for more data 119 that corresponds to other zoom levels than would be visible at the zoom level of the requested map data 117. Furthermore, the place page data generator 157 may query the repository 120 for data 119 that corresponds to expressed or predicted user interests before the data 119 is explicitly requested by a user. The place page data generator 157 may then insert the retrieved place page data 119 in the vector containing the requested map tile data 117 or may send the data 119 separately from the map tile data 117. The client device 102 may locally rasterize the vector data for each tile including the data 117, may provide a link to the data 119 in the created map image, or may store the retrieved place page data 119 in a cached memory 124 of the device 102.

The dynamic feature controller 154 may be communicatively coupled to the map tile generator 156 and place page data generator 157 and configured to determine which map elements are associated with the requested map data and generate vector-based or other descriptions of these map elements. For example, the dynamic feature controller 154 may determine that, in response to a request for map data corresponding to zoom level Zi for a certain geographic region, vector descriptors corresponding to interstate highways, large bodies of water, etc. must be generated, whereas in response to another request for map data corresponding to zoom level Zj for the same geographic region, additional vector data corresponding to local roads and buildings must be generated. Further, in some cases, the dynamic feature controller 154 generates different sets of vector data for different map types. For example, a terrain map may include map elements that are not included in a basic map for the same geographic region and zoom level.

In some embodiments, the user preferences system 114 (FIG. 1A) may include a user preferences system server 128 that includes a module 129 with instructions to receive preferred geographic region 106A and user personal interests data 125 (geographic/personal preferences data 130A) that is pushed from the device 102 or to pull preferred geographic region 106A and user personal interests data 125 from the device 102. For example, the user preferences data repository 126 may receive and store data from a variety of other modules and applications executing on the client device 102 or in communication with the device 102 (e.g., a web browser, a user preferences tracking module, a trip planning module, an email module, a social networking module, etc.). The client device 102 may then forward the data 125 to the user preferences system 114 for analysis. Similarly, the mapping module 106 may collect geographic preferences data 106A and then forward that data to the user preferences system 114 for analysis. In some embodiments, the client device 102 may periodically forward a web browser history, e-mail text including geographic locations or personal interests, travel documents, online profiles including geographic or personal preferences data, or other data generated or received by applications executing on the client device 102 to the user preferences system 114. Where the preferred geographic region 106A and user personal interests data 125 is received by the user preferences system 114, the module 129 may analyze the data 130A to determine both geographic locations and the types of businesses or other map features that the user will likely request mapping system data in the future. The user preferences system module 129 may also include instructions to generate requests for place page data 119 corresponding to the user geographic/personal interests data 130A locations. Further instructions at the module 129 may then forward the generated requests to the map request processor 158 of the mapping system 112. The map request processor 158 may then forward the request to the place page data generator 157 to retrieve place page data 119 corresponding to the geographic locations determined from the user's geographic/personal preferences data 130A. The retrieved data 119 may be filtered by user geographic/personal preferences to only return data 119 that matches those preferences. For example, where the system 100 determines that the user will likely request data for Boston and the preference data includes a user interest in "museums" the generator 157 may use user geographic/personal interests data 130A to only return place page data 119 corresponding to museums in Boston. When the user geographic/personal interests data 130A is analyzed at the backend by the module 129 to determine likely future geographic locations and personal interests for the user, the label and place page generator 157 may execute instructions to push the place page data 119 from the place page data repository 120 to the cache memory 124 of the client device 102. When the data 106A, 125 is analyzed at the front end, a module on the client device (e.g., the mapping module, etc.) may implement the functions of the label and place page generator 157 and pull the place page data 119 from the place page data repository 120 to the cache memory 124 of the client device 102.

In some embodiments, the user preferences system server 128 may store the user geographic/personal preferences data 130A in one or more data repositories 130. For example, the user geographic/personal interests data 130A may include the user's profile information, social networking information, browser search history data, e-mail and other message data, trip planning data, mapping system favorites, or other data indicating expressed or likely geographic and personal interests of the user. The module 129 may include computer-executable instructions to analyze the data stored in the data repositories 130, as described herein. Analysis of the user geographic/personal interests data 130A by the module 129 may determine the subject or type of data requests that the user preferences system server 128 may send to the mapping system 112 and the label and place page generator 157.

Figure 2:
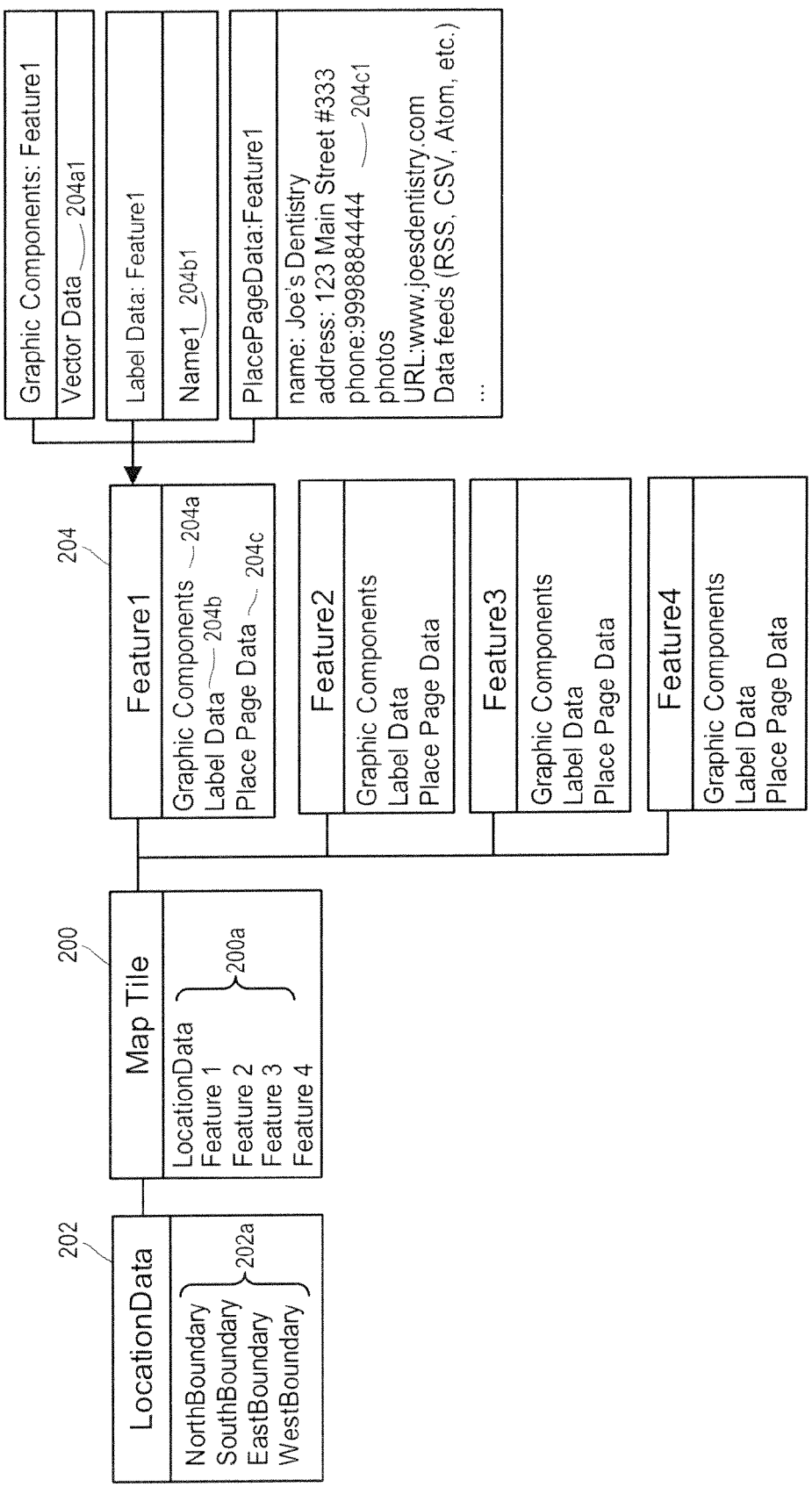
FIG. 2 is an exemplary data structure for pre-fetched place page data.

FIG. 2 illustrates one embodiment of a high-level block diagram for place page data corresponding to map tile data. A map tile 200 may include a plurality of attributes 200a, for example, location data 202, and several features 204, as described above. The data components that make up a raster image of a map on a client computing device may be logically linked among various data sources. For example, map tile data 117 stored within the map tile data repository 118 may be logically linked to place page data 119 of the place page data repository 120. The location data 202 may include particular coordinates 202a that describe the specific geographic location of the map tile 200 that represents a geographic area. In some embodiments, the location data 202 includes a plurality of boundaries 202a such as a north, south, east, and west boundary for the map tile 200. The location data 202 may include latitude and longitude coordinates as determined by a global positioning system (GPS) or other system that is able to determine where the geographic location or physical object is located. Each feature 204 of a map tile 200 may include graphic components 204a and logical links to place page data 204b. Graphic components 204a for each feature 204 may include vector data 204a1 retrieved from the map tile data repository 118 to illustrate a feature 204 within the map tile as rendered by the mapping module 106. Label data 204b for each feature 204 may include text data such as a name, title, or other designation 204b1 corresponding to a feature 204 as retrieved from the place page data repository 120 or other source. Place page data 204c for each feature 204 may include text, images, web and data feeds, as well as other information corresponding to a feature (i.e., a place of business, a landmark, etc.) as retrieved from the place page data repository 120, a data feed, or other source of data. Each feature 204 may also include location data 202. The location data for a feature 204 may include a GPS coordinate, a position within the boundaries 202a of the map tile 200, etc.

The place page data 204b, 204c may include various groups of information that describe characteristics of the features 204 within a map tile 200. In some embodiments, the information 204b, 204c includes listing information for businesses, points of interest, shopping centers, parks, etc., that are graphically represented within the map tile 200. The information 204b, 204c may also include specifications and other information describing the history of the object, physical specifications, etc. For example, the information 204b, 204c may include several features that include an icon, location, and data 204b, 204c for businesses, points of interest, etc., within the map tile 200. Place page data 204b, 204c may include text, photos, and other data to render a web page including information from various web resources that describes a particular listing represented by a feature 204, such as an icon or other graphic item, within the map tile 200.

Figure 3:
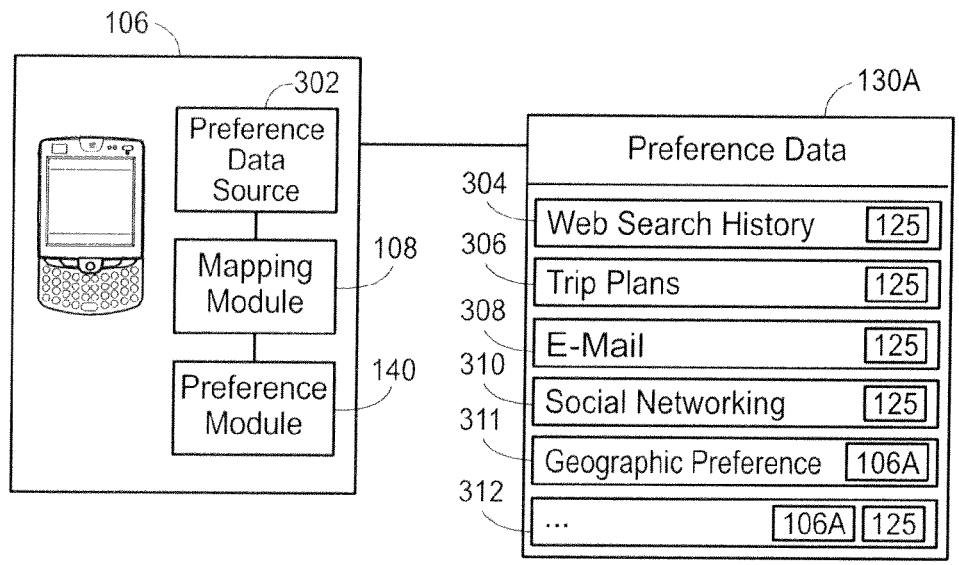
FIG. 3 is an exemplary block diagram of a mobile computing device and a data structure for user preference data.

FIG. 3 is a representation of user geographic/personal preference data 130A that may be used by the system 100 to determine the place page data 119 to be pulled or pushed from the place page data repository 120 for storage in cache memory 124 and subsequently displayed on the client device 102. In some embodiments, the user preferred geographic location data 106A and user personal interests data 125 from various sources 302 may be analyzed and combined to form geographic/personal preference data 130A. The geographic/personal preference data 130A may indicate a map feature (e.g., place of business, park, historic landmark, etc.) having the characteristics of both the user's preferred geographic location 106A and personal interests 125. For example, where the user indicates a geographic preference (i.e., a current location, a planned location, a hometown, a favorite location, a mapping application search result, etc.) for "Boston" and a personal interest for "home brewing" the geographic/personal preference data 130A may include a combination of those preferences such that a request to the place page data repository 120 would return place page data 119 for all home brewing or craft beer-related features near Boston.

The geographic/personal preference data 130A may be collected from various data sources 302 by a user preference module 140, a mapping module 106, or other modules. The data 103A may then be sent to a user preferences data repository 126 on the client computing device 102 or to backend data repositories 130 of a user preferences system 114 for analysis. The module 140 may push the data 130A to the backend user preferences system 114, or the user preferences system 114 may pull the data 130A to one or more backend repositories 130 for analysis by the user activity system module 129. The module 140 and repository 126 may be in communication with one or more sources 302 including geographic/personal preference data-producing applications, websites, data feeds, or other sources 302 executing on or in communication with the client device 102. In other embodiments, the sources 302 may periodically send data 130A (e.g., combined user preferred geographic location data 106A and user personal interests data 125) directly to a backend component such as the user activity system 114 without sending the data 130A to a module 140 or repository 126. For example, the backend user preference system module 129 executing on the user preference system server 128 may include computer-executable instructions to cause the client device 102 to pull or retrieve user preferred geographic location data 106A from the mapping application 106 and user personal interests data 125 from the repository 126 or directly from the sources 302 and forward the data to the system 114. In other embodiments, the sources 302 periodically send data 130A to the user preference system 114 for analysis by the module 129 without first sending the data 130A to a client-side repository 126 or mapping system 106 or executing instructions of the client-side user preference module 140.

The data 130A may include any type of profile, user history, log, or other data produced by a user geographic/personal data source 302 executing on or in communication with the client device 102. In some embodiments, the data 130A includes web search history data 304 from a web browser application, trip plan data 306 from a trip planning application, location-related e-mail data 308 from an e-mail application, social networking data 310 indicating a geographic location (e.g., a hometown location, a favorite places data entry, etc.), geographic preferences 311 or other data 312, etc. Of course, one or more of the backend user preference system module 129 and the front end user preference module 140 may monitor any source 302 for data that indicates a preferred geographic location or user personal preference and that could be used to pre-fetch place page data 119 from the repository 120 for cache storage and subsequent display on the client device 102. Each of the various sets of user preference data 304, 306, 308, 310, 311, 312, may include data 314 that indicates a geographic/personal preference 130A for the user (e.g., preferred geographic location data 106A and user personal interests data 125).

Figure 4:
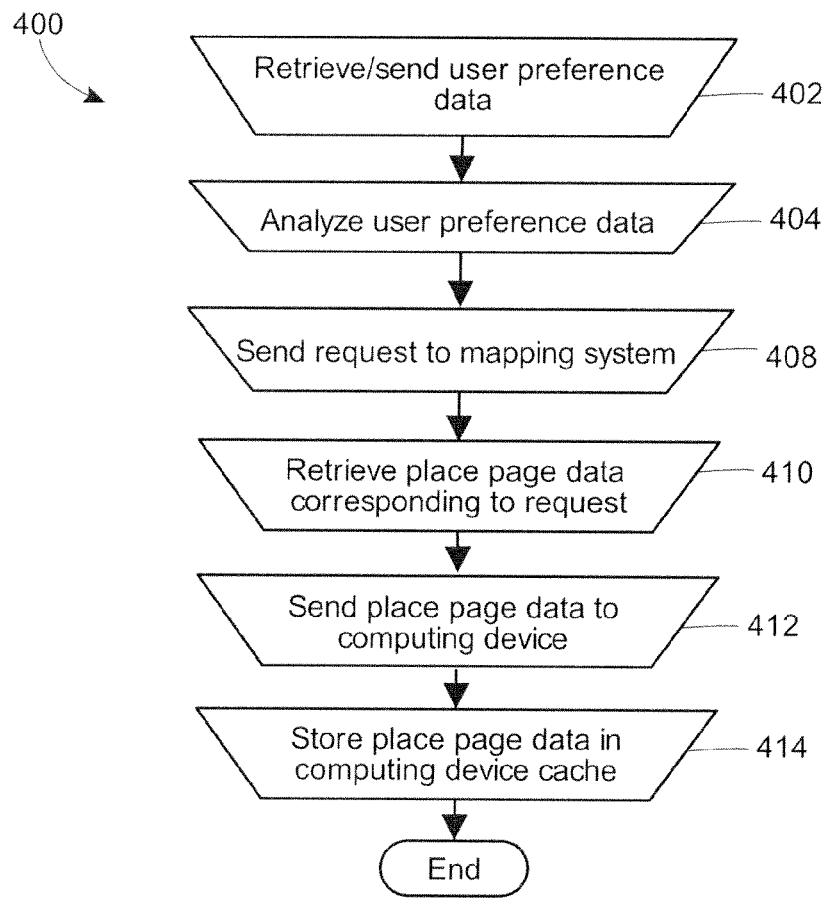
FIG. 4 is an exemplary flow chart of one method for pre-fetching place page data from a remote, backend mapping system as described herein.

FIG. 4 is a flow diagram of an example method 400 for pre-fetching place page data 119 for storage within a cache memory 124 and subsequent display on a client device 102. The method 400 may include one or more blocks, modules, functions or routines in the form of computer-executable instructions that are stored in a tangible computer-readable medium and executed using a processor 108 of the client device 102 (e.g., a smart phone, tablet computer, or a mobile computing device, or other personal computing device, as described herein) or one or more servers 116, 128. The method 400 may be included as part of any modules of a computing environment for a system 100 for pre-fetching label place page data 119, for example, or as part of a module that is external to such a system. For example, the method 400 may be part of a backend map controller 116c, a user preferences system module 129, a frontend user preferences data module 140, or a mapping module 106. The method 400 may execute at either the frontend 102 or backend 110. Further, a user may activate or disable one or more options to allow or prohibit the system 100 to collect or send user preferred geographic location data 106A and user personal interests data 125 from any sources 302 executing at or in communication with the client device 102. For example, a user interface of the mapping module 106 may allow a user to opt-in or opt-out of any user geographic/personal preference data 130A (including a combination of user preferred geographic location data 106A and user personal interests data 125) collection as described herein. FIG. 4 will be described with reference to FIGS. 1A, 1B, 2, and 3 for ease of explanation, but the method 400 may of course be utilized with other objects and user interfaces.

At block 402, the method 400 may retrieve or receive user preferred geographic location data 106A and user personal interests data 125 from one or more personal preference data sources 302. The user preferred geographic location data 106A and user personal interests data 125 retrieved from the sources 302 may include profile, user history, log, or other data produced by a user geographic/personal data source 302 executing on or in communication with the client device 102. In some embodiments, the user geographic/personal preference data 130A may be retrieved from the client device 102 in response to a request from the user preferences system 114. In further embodiments, the client device 102 may periodically send the user geographic/personal preference data 130A to backend components 110. The user preferences system 114 may also retrieve/receive the user geographic/personal preference data 130A from other sources such as another computing device linked to the device 102 or the user preferences system 114 via a web services account that is common to a user of both the client computing device 102 and the other device.

At block 404, the method 400 may analyze the user preferred geographic location data 106A and user personal interests data 125 to determine user geographic/personal preference data 130A. In some embodiments, the method 400 may send the user preferred geographic location data 106A and user personal interests data 125 to a local module (e.g., the user preferences module 140, the mapping module 106, etc.) or a remote user activity system 114 via a network connection for analysis. For example, a user preferences server 128 may receive or retrieve the data 106A, 125 and the module 129 or 106 may combine the data 106A and 125 to create user geographic/personal preference data 130A. The module 129 may include one or more computer-executable instructions to create a tuple from the data 106A, 125 that indicates both a peographic preference and a personal interest preference. The resulting user geographic/personal preference data 130A determined from the user preferred geographic location data 106A and user personal interests data 125 may include a city name, an address, an airport code, GPS coordinates or any other information indicating the user's geographic interests as well as user profile, personal interests, social networking, and other data indicating the user's personal interests. The module 129 or 140 may then generate a request for place page data 119 that includes the user geographic/personal preference data 130A.

At block 408, the module 129 or module 140 may send the user preference data 314 to a mapping system 112. In some embodiments, user preference data 314 determined from the data 130A may be sent to the mapping system 112 as a request for place page data 119 corresponding to the user preference data 314. The module 129 or module 140 may also include computer-executable instructions to store the user preference data 314 within one or more data repositories. For example, the module 129 or module 140 may analyze a user profile, web search history, or other data source 302 and determine user preference data 314. In some embodiments, the data 314 may be stored within the a repository 126. The data 314 may then be pushed or pulled from the repository 126 and sent to a backend component (e.g., the mapping system 112, the user preference system 114, etc.).

The user geographic/personal preference data 130A or the determined user preference data 314 may also include timestamp information and the module may include computer-executable instructions to determine a threshold time period for which the determination of user activity location data 314 would warrant caching the data. For example, if the module 129 or module 140 determined three user preference data 314 indications for "Boston" within a time period of a week, the module may determine that one or more thresholds have been exceeded and execute further instructions to retrieve and cache place page data corresponding to user preferences/interests near the city of Boston. In contrast, if the module 129 determined three user preference data 314 indications for "Boston" within a time period of a year, the module 129 or module 140 may determine that one or more thresholds have not been exceeded and not execute a mapping system request for place page data corresponding to the user's interests for Boston. Of course, block 404 and 408 may perform statistical and other analyses of the user geographic/personal preference data 130A to determine whether to proceed to the next.

At block 410, the module 117 may execute instructions to match the received data 314 to place page data 119. In some embodiments, block 410 includes instructions to match the received user preference data 314 to place page data 119 that corresponds to an analysis result 140 sent to the mapping system 112 by the user activity module 140 executing on the client device 102. In further embodiments, block 410 includes instructions to match the received user preference data 314 to place page data 119 that corresponds to an analysis result 140 sent to the mapping system 112 by the user activity system 114 executing as a backend component 110.

At block 412, the module 117 may execute instructions to send the place page data retrieved at block 410 to a client computing device 102. In some embodiments, block 412 includes instructions to cause the mapping system 112 to send place page data 119 to a cache memory 124 of the client device 102. As discussed above, because place page data 119 is relatively lightweight compared to map tile data, block 412 might initially send place page data 119 to the computing device 106. Furthermore, in areas where the user is familiar with his or her surroundings and does not require a map for navigation, place page data 119 alone may be sufficient for finding businesses or other map features of personal interest to the user. Later, map tile data 117 may be retrieved and the place page data may be layered onto the map tile data 117 and graphically displayed together. The method 400 may also send the retrieved place page data 119 to a mapping module 106 executing on the client computing device 102.

At block 414, the client computing device 102, mapping module 106, or user activity module 140 that received the place page data 119, may execute instructions to store the received data within a cache memory 124. The mapping module 106 may then use the cached place page data for display on the client computing device 102 from the cache 110 during periods of low or no connectivity between the client computing device 102 and the backend components 110, or during other times when graphic map data is either unavailable or not needed by the user.

Figure 5:
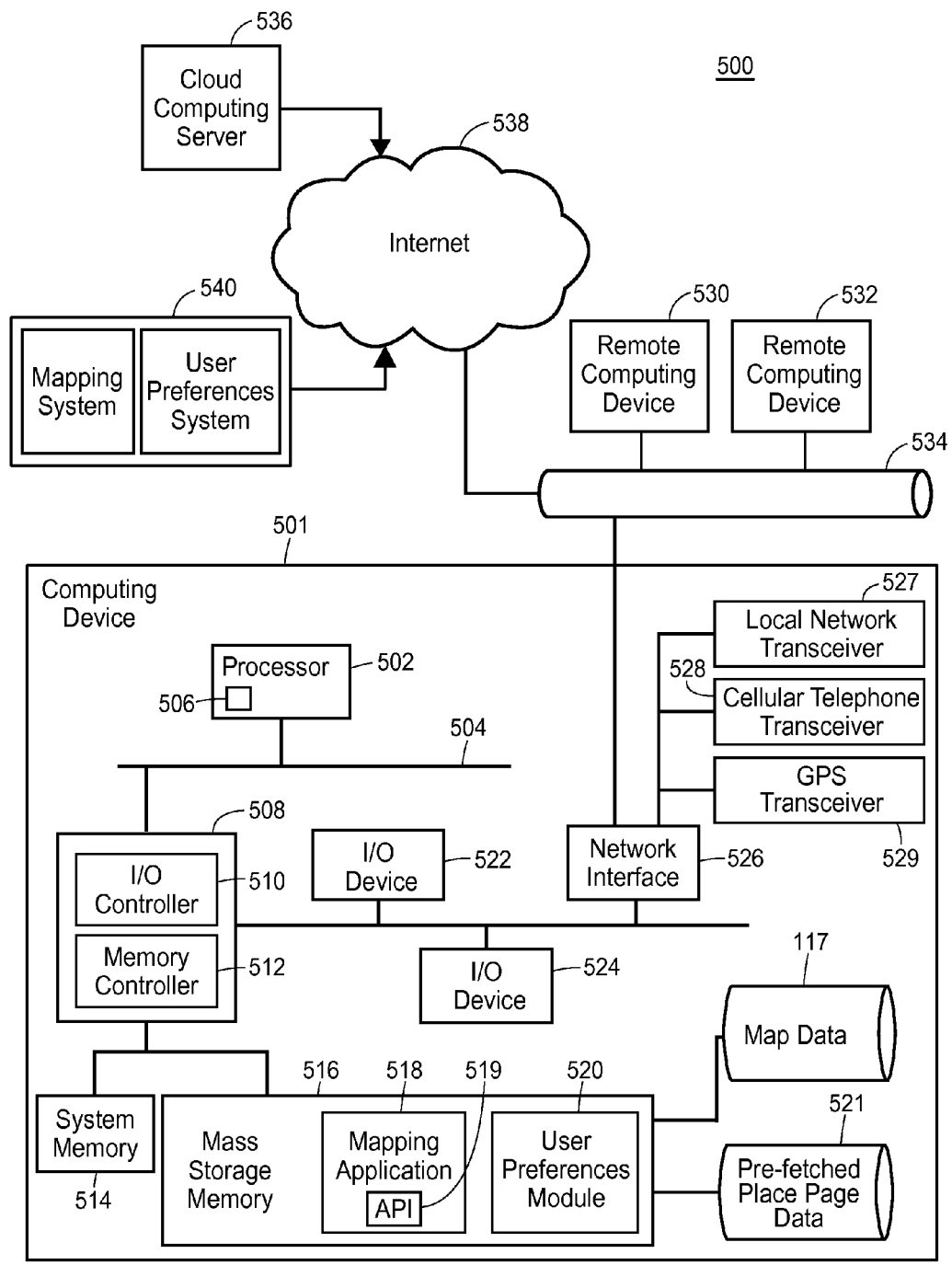
FIG. 5 is high-level block diagram of a computing environment that implements a system and method for pre-fetching place page data for cache storage and display on a computing device.

FIG. 5 is a high-level block diagram of an example computing environment for a mobile mapping system 500 having a computing device 501 that may be used to implement the method and systems described herein. The computing device 501 may include a mobile computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 500 may be used to implement and execute the example system of FIG. 1, the data structures of FIGS. 2 and 3, the method of FIG. 4, and the like. Although the example mobile mapping system 500 is described below as including a plurality of peripherals, interfaces, chips, memories, etc., one or more of those elements may be omitted from other example processor systems used to implement and execute the example system 100 to pre-fetch place page data. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a mapping application 518 having an API 519 and a user preference module 520 (including instructions as described by the method 400 of FIG. 4), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mobile mapping system 500. Thus, a module, block, function, operation, procedure, routine, step, and method can be implemented in hardware, firmware, and/or software. In one embodiment, program modules and routines (e.g., the mapping application 518, the API 519, the user activity module 520, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include a cache memory 521 storing pre-fetched place page data, graphics, and other data for use by the mapping application 518 and user preferences 520.

The peripheral I/O controller 510 performs functions that enable the processor 502 to communicate with peripheral input/output (I/O) devices 522 and 524, a network interface 526, a cellular network transceiver 527, a local network transceiver 528, and a GPS transceiver 529 (via the network interface 526) via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 522 and 524 may be used with the mapping application 518 and user activity module 520 to receive GPS data from the GPS transceiver 529, send the GPS data to the backend components of the system 100, render, and display maps and user interfaces as described in relation to the figures. A cellular telephone transceiver 527 may be resident with the local network transceiver 528. The local network transceiver 528 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on aperiodic basis. Such polling may be possible even while normal wireless traffic is being supported on the computing device 501. The network interface 528 may be, for example, an Ethernet device, an asynchronous transfer mode (ATM)

device, an 802.11 wireless interface device, a DSL modem, a cable modem, a cellular modem, etc., that enables the system 100 for pre-fetching place page data to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The mobile mapping system 500 may also implement the mapping application 518 and user preferences module 520 on remote computing devices 530 and 532. The remote computing devices 530 and 532 may communicate with the computing device 501 over an Ethernet link 534. For example, the computing device 501 may receive mapping data created by a mapping application executing on a remote computing device 530, 532. In some embodiments, the mapping application 518 and/or the user preferences module 520 may be retrieved by the computing device 501 from a cloud computing server 536 via the Internet 538. When using the cloud computing server 536, the retrieved mapping application 518 and/or the user preferences module 520 may be programmatically linked with the computing device 501. The mapping application 518 and/or the user preferences module 520 may be a Java® applet executing within a Java® Virtual Machine (JVM) environment resident in the computing device 501 or the remote computing devices 530, 532. The mapping application 518 and/or the user preferences module 520 may also be "plug-ins" adapted to execute in a web-browser located on the computing devices 501, 530, and 532. In some embodiments, the mapping application 518 and/or the user preferences module 520 may communicate with back end components 540 such as the data system 112 and user preferences system 114 via the Internet 538.

Using the systems and procedures described above, the system for pre-fetching place page data 100 and mapping system 500 can retrieve and analyze data from a computing device that indicates a geographic location corresponding to user preference. User profiles, expressed interests, or other data may be parsed to determine likely locations for pre-fetching place page data. Similarly, local or remote user geographic/personal preference data may be stored at the mobile device, forwarded to a user preferences system or other system, and used by a remote mapping system to provide locations to pre-fetch place page data. Of course, the systems described herein may present a user with a user interface from which the user is able to opt-out of any of the user geographic/personal preferences data gathering methods described herein.

The system 500 may include but is not limited to any combination of a LAN, a MAN, a WAN, a mobile, a wired or wireless network, a private network, or a virtual private network. Moreover, while only three remote computing devices 530 and 532 are illustrated in FIG. 5 to simplify and clarify the description, it is understood that any number of client computers are supported and can be in communication within the system 500.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for pre-fetching place page data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for pre-fetching place page data for subsequent display on a mobile computing device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art may be made in the arrangement, operation and details of the method and apparatus disclosed herein without departing from the spirit and scope defined in the appended claims.

What is claimed is:

1. A computer-implemented method for pre-fetching place page data to a mapping application executing on a client computing device from a remote mapping system for subsequent display on the client computing device, the method comprising:

analyzing, by one or more processors, user preferred geographic location data and user personal interests data to determine user preference data, wherein the user preferred geographic location data includes data indicating one or more particular map locations that are preferred by a user of the client computing device and the user personal interest data includes data indicating personal interests of the user;

analyzing, by one or more processors, the user preference data to determine: (i) map data in a vector format for rendering an interactive digital map of the one or more particular map locations at a certain zoom level, and (ii) one or more matched place page data of the remote mapping system corresponding to the personal interests of the user at the one or more particular map locations, wherein the place page data includes one or more of text, graphics, and data feed data describing a map feature, wherein at least some of the place page data corresponds to a zoom level other than the certain zoom level of the map data; and wherein the map data and the place page data correspond to a same geographic region, including analyzing timestamp information associated with the user preference data to determine whether the place page data for the one or more particular map locations should be cached;

sending the map data and the matched place page data from the remote mapping system to the client computing device, including sending the map data separately from the place page data, so that the place page data is available independent of all or some of the memory burden of the corresponding map data;
storing the map data and the matched place page data in a cache memory of the client computing device; and
subsequently retrieving the map data and the matched place page data from the cache memory of the client computing device without further communication between the remote mapping system and the client computing device.

2. The method of claim 1, further comprising retrieving the user preferred geographic location data from a mapping application of the client computing device.

3. The method of claim 2, wherein the user preferred geographic location data includes one or more of a city name, an address, an airport code, or global positioning system coordinates.

4. The method of claim 3, wherein the user preferred geographic location data is indicated by one or more of a GPS position that was flagged using the mapping application, a geographic location returned to the client computing device by the remote mapping system, and a geographic location having an indicated preference.

5. The method of claim 1, further comprising retrieving the user personal interests data from one or more of a social networking application, an e-mail application, and a web browser of the client computing device.

6. The method of claim 5, wherein the user personal interests data includes one or more of user profile data, social networking data, web browser history data, e-mail text, and calendar appointment data.

7. A computer-implemented method for pre-fetching place page data from a remote mapping system to a mapping application for subsequent display on a client computing device executing the mapping application during conditions of no connectivity between the remote mapping system and the client computing device, the method comprising:
periodically sending user preferred geographic location data and user personal interests data from the client computing device to a backend user preferences system, wherein the user preferred geographic location data includes data indicating one or more particular map locations that are preferred by a user of the client computing device and user personal interest data indicative of personal interests of the user, wherein the backend user preferences system analyzing timestamp information associated with preference data for the user to determine whether the place page data for the one or more particular map locations should be cached;
receiving (i) map data in a vector format for rendering an interactive digital map of the one or more particular map locations at a certain zoom level, and (ii) place page data corresponding to the personal interests of the user at the one or more particular map locations from the remote mapping system in response to the sent user preferred geographic location data and user personal interests data, the place page data including one or more of text, graphics, and data feed data describing a map feature, including receiving the map data separately from the place page data, so that the place page data is available independent of all or some of the memory burden of the corresponding map data, wherein at least some of the place page data corresponds to a zoom level other than the certain zoom level of the map data; and wherein the map data and the place page data correspond to a same geographic region;
storing the map data and the place page data in a cache memory of the client computing device; and
subsequently retrieving the map data and the place page data from the cache memory of the client computing device without further communication between the remote mapping system and the client computing device.

8. The method of claim 7, wherein the user preferred geographic location data includes one or more of a city name, an address, an airport code, or global positioning system coordinates.

9. The method of claim 8, wherein the user preferred geographic location data is indicated by one or more of a GPS position that was flagged using the mapping application, a geographic location returned to the client computing device by the remote mapping system, and a geographic location having an indicated preference.

10. The method of claim 9, wherein periodically sending user preferred geographic location data and user personal interests data from the client computing device to a backend user preferences system includes periodically sending the user personal interests data from one or more of a social networking application, an e-mail application, and a web browser of the client computing device.

11. The method of claim 10, wherein the user personal interests data includes one or more of user profile data, social networking data, web browser history data, e-mail text, and calendar appointment data.

12. A client computing device comprising:
a processor;
a transceiver to communicate with a backend user preferences system via a network connection;
a cache memory; and
a memory storing an application and instructions for execution by the processor, the instructions causing the processor to:
periodically cause user preferred geographic location data and user personal interests data to be sent from the client computing device to the backend user preferences system via the network connection, wherein the user preferred geographic location data includes data indicating one or more particular map locations that are preferred by a user of the client computing device and user personal interest data indicative of personal interests of the user, wherein the backend user preferences system analyzing timestamp information associated with preference data for the user to determine whether the place page data for the one or more particular map locations should be cached,
receive (i) map data in a vector format for rendering an interactive digital map of the one or more particular map locations at a certain zoom level, and (ii) place page data corresponding to the personal interests of the user at the one or more particular map locations from a remote mapping system via the network connection, the place page data received in response to the sent user preferred geographic location data and user personal interests data, the place page data including one or more of text, graphics, and data feed data describing a map feature, wherein at least some of the place page data corresponds to a zoom level other than the certain zoom level of the map data; wherein the map data and the place page data correspond to a same geographic region, wherein the map data is received separately from the place page data, so that the place page data is available independent of all or some of the memory burden of the corresponding map data, store the received map data and the place page data in the cache memory; and display the map data and the place page data from the cache memory without further communication between the remote mapping system and the client computing device.

13. The client computing device of claim 12, wherein the user preferred geographic location data includes one or more of a city name, an address, an airport code, or global positioning system coordinates.

14. The client computing device of claim 12, wherein the user preferred geographic location data is indicated by one or more of a GPS position that was flagged using the mapping application, a geographic location returned to the client computing device by the remote mapping system, and a geographic location having an indicated preference.

15. The client computing device of claim 14, wherein the user personal interests data includes one or more of user profile data, social networking data, web browser history data, e-mail text, and calendar appointment data.

16. The method of claim 1, wherein sending the map data and the matched place page data from the remote mapping system to the client computing device includes sending the place page data at a zoom level at which the map data is not visible.

17. A method in client computing devices for pre-fetching place page data for subsequent display, the method comprising:

requesting, at a client computing device from a remote mapping system, (i) map data in a vector format for rendering an interactive digital map for a certain geographic region at a certain zoom level, and (ii) place page data corresponding to the personal interests of the user at the same geographic region, the place page data including one or more of text, graphics, and data feed data describing a map feature, wherein the remote mapping system analyzes timestamp information associated with preference data for the user to determine whether the place page data for the one or more particular map locations should be cached;

receiving, from the remote mapping system, the map data and the place page data for the geographic region, including receiving place page data without accompanying map data for a portion of the geographic region, so that the place page data is available independent of all or some of the memory burden of the corresponding map data;

storing the received map data and the received place page data in a cache memory of the client computing device;

subsequently retrieving the map data and the place page data from the cache memory of the client computing device without further communication between the remote mapping system and the client computing device; and displaying the retrieved map data and place page at the client device, including displaying place page data without also displaying map data that includes features described by the place page data for the at least the portion of the geographic region.

18. The method of claim 1, further comprising:

periodically sending user preferred geographic location data and user personal interests data from the client computing device to a backend user preferences system, wherein the user preferred geographic location data includes data indicating one or more particular map locations that are preferred by a user of the client computing device and user personal interest data indicative of personal interests of the user.

19. The method of claim 18, wherein the user preferred geographic location data is indicated by one or more of a GPS position that was flagged using a mapping application of the client computing device, a geographic location returned to the client computing device by the remote mapping system, and a geographic location having an indicated preference.

* * * * *